United States Patent [19]

Paquette et al.

[11] Patent Number: 4,605,592

[45] Date of Patent: Aug. 12, 1986

[54] COMPOSITE DECORATIVE ARTICLE

[75] Inventors: Susan Z. Paquette, Saint Paul; Dennis O. Falaas, Stillwater, both of Minn.

[73] Assignee: Minnesota Mining and Manufacturing Company, St. Paul, Minn.

[21] Appl. No.: 596,627

[22] Filed: Apr. 4, 1984

Related U.S. Application Data

[63] Continuation-in-part of Ser. No. 409,496, Aug. 19, 1982, abandoned.

[51] Int. Cl.⁴ .......................... C09J 7/02; B32B 27/40
[52] U.S. Cl. .................................. 428/334; 428/354; 428/355; 428/423.5; 428/424.4; 428/424.6; 428/518; 428/520; 156/332; 156/DIG. 34
[58] Field of Search .................... 428/518, 520, 334; 156/332

[56] References Cited

U.S. PATENT DOCUMENTS

| | | | |
|---|---|---|---|
| 3,900,674 | 8/1975 | Coffman | 428/355 |
| 4,175,156 | 11/1979 | Ikins | 428/424.4 |
| 4,284,681 | 8/1981 | Tiomarsh et al. | 428/518 |

Primary Examiner—P. C. Ives
Attorney, Agent, or Firm—Donald M. Sell; James A. Smith; Gerald F. Chernivec

[57] ABSTRACT

A multilayer decorative article having in order an ink-receptive vinyl film layer, a plasticizer barrier layer, and a pressure-sensitive adhesive layer, the adhesive layer being adapted to maintain adhesion to highly plasticized vinyl substrates, and the intermediate barrier layer being capable of preventing plasticizer from migrating from the vinyl substrate into the vinyl film outer layer.

20 Claims, 1 Drawing Figure

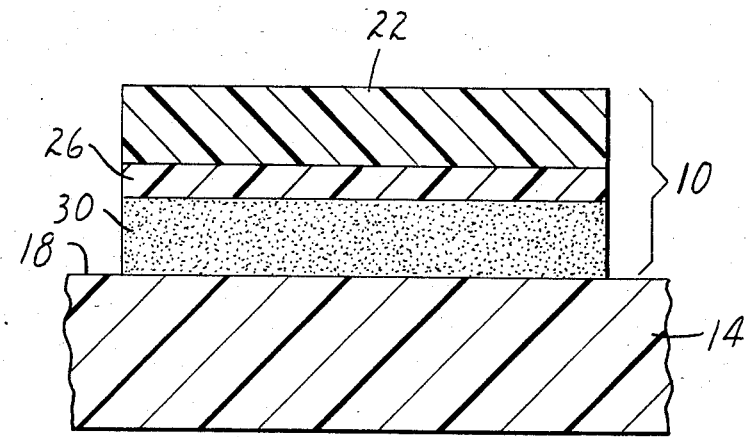

COMPOSITE DECORATIVE ARTICLE

This is a continuation in part of our U.S. application Ser. No. 409,496, filed Aug. 19, 1982, now abandoned.

TECHNICAL FIELD

This invention relates to a composite sheet material particularly suited as a decorative film for application to highly plasticized polyvinyl chloride substrates.

Highly plasticized vinyl substrates have found extensive use for interior surfaces such as wall coverings and exterior surfaces such as vinyl coated canvas employed as the covering for soft sided trucks. These vinyl substrates contain as much as 25-75 parts of monomeric plasticizer, usually dioctylphthalate, to 100 parts of vinyl resin. Decoration of vinyl coated canvas is currently done by hand painting or air brushing screen printing inks. Vinyl wall coverings are decorated by removing the area of the wall covering on which another color is desired and replacing it with another piece of wall covering of the desired color. Such decorative techniques for vinyl substrates are costly and inefficient. To date, prefabricated graphics in the form of pressure sensitive adhesive-backed vinyl film bearing screen-printed graphics, such as are conventionally used for vehicular markings, have not been adapted for decorating such highly plasticized vinyl substrates due to the wrinkling of the vinyl film and loss of adhesion to the vinyl substrate. The problems are believed attributable, at least in part, to the migration of monomeric plasticizers from the vinyl substrate into the vinyl film and adhesive.

BACKGROUND ART

The problem of plasticizer migration has been previously recognized. U.S. Pat. No. 4,284,681 discloses a composite material having a highly plasticized polyvinyl chloride layer and a fibrous backing layer and an intermediate plasticizer barrier layer such as a polyurethane resin. The barrier layer directly contacts the polyvinyl chloride layer. U.S. Pat. No. 4,045,600 discloses a process in which successive layers of a polyurethane resin are applied directly to a plasticized polyvinyl chloride substrate for the purpose of inhibiting plasticizer migration.

The principle objective of the present invention is to provide a composite vinyl decorative film capable of maintaining adhesion and a substantially wrinkle free surface when adhered to a highly plasticized polyvinyl chloride surface.

Another object of this invention is to provide a vinyl decorative film having the foregoing properties which is receptive to conventional inks such as those employed in the screen printing industry.

DISCLOSURE OF INVENTION

These objectives, and others which will be apparent, are achieved by a composite decorative article comprising (1) a first layer comprising a polyvinyl chloride film, (2) a second layer of a plasticizer resistant, pressure sensitive adhesive comprising the reaction product of reactants comprising (a) acrylic acid and/or methacrylic acid and/or acrylamide and/or methacrylamide, (b) an alkylacrylate and/or alkylmethacrylate, and (c) at least one additional ethylenically unsaturated monomer, and (3) a third, migratable plasticizer barrier layer between said first and second layers.

BRIEF DESCRIPTION OF DRAWING

Reference is made to the accompanying drawing, a greatly enlarged section view of the article of the invention, in which numeral 10 denotes the decorative composite article applied to a vinyl substrate 14 containing plasticizers, particularly monomeric materials such as dioctylphthalate, which tend to migrate from the substrate body to the surface 18. Decorative article 10 includes a vinyl film layer 22, an intermediate plasticizer barrier layer 26, and plasticizer resistant pressure-sensitive adhesive layer 30. To protect the adhesive prior to use, a release liner is provided which is removed prior to affixing the article 10 to vinyl substrate 14.

Vinyl film layer 22 preferably exhibits flexibility, exterior durability, acceptable handling and application characteristics, and receptivity to commonly used screen printing inks. A typical formulation of the vinyl film includes polyvinyl chloride resin, light and/or heat stabilizer, plasticizer and pigment. The amount of plasticizer is generally less than 40% by weight, and is preferable composed of polymeric, non-migratable plasticizers which are compatible with the vinyl film and provide the necessary durability and flexibility. A preferred plasticizer component is a combination of a polymeric polyester elastomer and a vinyl acetate/ethylene copolymer (such as DuPont's Elvaloy 742) soluble in aromatic solvents and present in amounts of 26 parts and 10 parts, respectively per 100 parts vinyl resin.

Vinyl films having a thickness between about 0.7 and about 5.0 mils (0.02 mm. and 0.13 mm.) perform acceptably, although a thickness between about 1.0 and 2.0 mils (0.02 mm. and 0.05 mm.) is preferred. The vinyl film may be fabricated by any conventional means including casting, extruding and calendering. Films thinner than 0.7 mil (0.02 mm.) are difficult to produce and generally do not provide the necessary opacity, handling, application and durability characteristics.

The intermediate plasticizer barrier layer, which generally and preferably is in contact with one or both of the vinyl film and pressure sensitive adhesive layers, inhibits plasticizer migration into the vinyl film outer layer and resultant damage thereto. In addition, the barrier layer imparts other beneficial characteristics to the composite such as flexibility, good adhesion between the vinyl film and adhesive layer, and resistance to chemical cleaners such as soaps, lower alcohols, and screen printing inks/solvents. In applications where the composite article is subjected to frequent cleaning or water exposure, water soluble materials used as barrier layers would not be expected to perform satisfactorily unless they were rendered insoluble in the final composite. In those instances in which the intermediate layer is solvent coated on the vinyl, the solvent must be compatible with, i.e., not deleteriously affect, the vinyl film.

The preferred intermediate barrier layer is an aliphatic polyurethane resin, Desmolac 4125, available from Mobay Chemical Co. Desmolac 4125 is a reaction product of a cycloaliphatic isocyanate with a polyester resin and is supplied in a 20% by weight solids solution in isopropanol and toluene. This material is coated to yield a dry thickness of 0.013 mm. Drying of the urethane resin solution is carried out for five to ten minutes at temperatures of from 66° C. to 111° C.

The adequacy of a particular intermediate barrier layer may be determined by the following test. All parts and percentages expressed throughout are by weight unless otherwise stated. The test involves coating the polymer solution at a dry thickness of approximately 0.5 mils (0.013 mm.) on a 1.1 mil (0.028 mm.) vinyl film followed by lamination to a plasticizer resistant pressure sensitive adhesive (the adhesive of Example 1) at a coating weight of approximately 11.0 grains per 24 in.² (0.713 grams/154.8 cm.²). The performance of this film composite is evaluated by applying these films to a highly plasticized polyvinyl chloride substrate, i.e., 67 parts of dioctylphthalate plasticizer per 100 parts of vinyl resin. The film samples are then aged in an oven for one week at 66° C. The films which do not delaminate or wrinkle upon accelerated aging are said to perform acceptably, and the intermediate layer is said to act as an acceptable plasticizer barrier.

The adhesive employed in the present invention is pressure sensitive and resistant to damage from, i.e, tolerant to, vinyl plasticizer which migrates from the vinyl substrate to the vinyl substrate/adhesive interface or into the adhesive matrix. The adhesive must provide adequate adhesion between the decorative composite and the plasticized substrate. To evaluate adhesives the individual samples are cast at coating weights of 8–11 grains per 24 in.² (0.5 grams–0.8 grams per 154.8 cm.²) dried and laminated to the urethane-vinyl film combination to prepare the final composite. The composites are then tested according to ASTM D-1000 to determine adhesion values initially and after aging for one week at 66° C. on highly plasticized vinyl substrates. In general, those films which maintain 3.0 lbs./in. (0.54 kg./cm.) adhesion after aging for seven days at 66° C. per the test and do not wrinkle under test conditions constitute acceptable plasticizer resistant adhesives.

Adhesives found to perform acceptable are pressure sensitive adhesives comprising polymers of acrylic and/or methacrylic acid and/or acrylamide and/or methacrylamide (preferably present in amounts from about 1.0% to about 10.0% by weight), an alkylacrylate and/or alkylmethacrylate in which the alkyl group preferably as at least 4 carbon atoms (preferably present in amounts from about 35.0% to about 85.0% by weight), and a further ethylenically unsaturated monomer different from the foregoing two types of monomers, such as N-vinyl pyrrolidone, methyl acrylate, or vinyl acetate. The preferred quantities of the latter monomers are about 5.0–15.0%, 15.0–50.0%, and 20.0–50.0% by weight, respectively. We have found that the alkyl portion of the acrylates and methacrylates are preferably provided by primary and secondary compounds as opposed to tertiary compounds, e.g., primary and second alkanols as opposed to tertiary alkanols. In other words, the carbon atom attached to the oxy (—O—) atom of the carbonyloxy

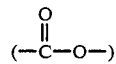

moiety has at least one hydrogen atom attached thereto.

A specific adhesive composition found suitable in the practice of this invention is a terpolymer made from 52.2 parts n-butylacrylate, 37.5 parts methyl acrylate, and 10 parts of acrylic acid. For economy this adhesive may be prepared at a low inherent viscosity and crosslinked with either an epoxy resin, a melamine resin, or a bisamide crosslinking agent. Another adhesive found suitable in the practice of this invention is a linear terpolymer consisting of 56.0 parts of isooctylacrylate, 40.0 parts of vinyl acetate and 4.0 parts of acrylic acid. The most preferred adhesive is a terpolymer prepared from 85.0 parts of n-butylacrylate or methylbutylacrylate, 10.0 parts of N-vinyl pyrrolidone and 5.0 parts of acrylic acid. This adhesive may be crosslinked with either a melamine resin or by using benzophenone in the presence of UV light. More information on this type of crosslinking may be found in U.S. Pat. No. 4,303,485. Preferably the benzophenone photocrosslinker is added at a concentration of 0.5% by weight of adhesive solids and irradiated by UV light at a dose rate of 2.3 joules per centimeter squared. The proper balance between adhesion and film shrinkage is produced if the adhesive is present at a dry coating weight of 9–13 grains, preferably 11 grains per 24 in.² (0.583–0.842 grams, preferably 0.713 grams, per 154.8 cm.²).

TEST METHODS

Adhesion

180° pullback adhesions are run according to ASTM D-1000, Method B, with an Instron tester to determine the adhesion of film applied to a vinyl substrate. This substrate, used in all described tests, is a polyester scrim which has been coated on both sides with a plastisol containing approximately 56% polyvinyl chloride resin, 37% dioctylphthalate and 7% pigment and then fused. The total thickness of the test substrate is 21 mils (53 cm.). The adhesion tests are conducted on specimens (1) applied for 24 hours at room temperature (Unaged-UA) (2) applied for one week at 66° C. (Aged on Panel-AOP) and (3) aged one week at 66° C. and then applied for 24 hours (Aged on Liner-AOL).

Appearance

Appearance studies are done by applying a 13 cm.×13 cm. swatch of composite article to a 15 cm.×15 cm. piece of vinyl substrate. (Both the unaged and aged on liner films are evaluated). These samples are then aged one week at 66° C. Wrinkling or severe edge shrinkage denotes poor results.

Flexing

Flexibility of the film is evaluated by applying 15 cm.×15 cm. swatch of composite article (both the unaged and aged on liner films are evaluated) to a 18 cm.×18 cm. piece of the vinyl substrate and flexing the sample 2000 cycles at 22° C. and −17.8° C. (2000 cycle flexing test). A more severe flexing test entails maintaining the applied sample at room temperature for one hour and then placing the sample in a 30° F. (−1° C.) cold room for four hours. The applied film is then reverse impacted with a 908 g. weight at 102 cm. using a Gardner Impact Tester. If the film does not crack, it passes the cold weather flexibility requirements.

Aging

Samples are aged by placing them in a 66° C. recirculating air oven for at least 48 hours.

Inherent Viscosity (I.V.)

Inherent viscosities are determined, according to the method found on page 49 of "Preparative Methods of Polymer Chemistry," by W. R. Sorenson and T. W. Campbell published by Interscience Publishers, New York (1968).

Adhesive Preparation

To a flask equipped with an efficient stirrer, nitrogen inlet tube, and reflux condenser, there are charged 100 grams of a solvent and 100 grams of a monomer blend. The flask is then heated to 55° C. if the solvent is acetone or 72° C. if the solvent is ethyl acetate and allowed to stir. The polymerization initiator, either alpha, alpha-azodi-(isobutyronitrile) or benzoyl peroxide, is then added to the solution. The reaction is allowed to continue until monomer conversion is approximately 95% as measured by gas chromatography. Periodic additions of solvent and/or initiator are made during the course of the reaction if necessary. The following examples will further illustrate the present invention.

EXAMPLE 1

A titanium dioxide pigmented, polymeric plasticized polyvinyl chloride film of a thickness of 1.0 mils (0.0254 mm.) is placed in contact with a paper carrier web. The intermediate barrier coat is next applied. Desmolac 4125 from Mobay Chemical Co. is coated through a conventional knife coater at 4.0 mil (0.102 mm.) wet coating thickness and dried in a 66° C. recirculating air oven for nine minutes to give a dry urethane film layer of 0.5 mils (0.0127 mm.) in thickness. The total film thickness of this sample, including the vinyl film and the urethane coating, is now 1.50 mils (0.038 mm.).

A release liner is used for the adhesive coating operation. The release liner may be any of the conventional release liners employed for pressure sensitive adhesive products. Preferred liner materials are clay coated papers which have been suitably coated with a silicone release agent. Polyolefin or polyethylene blends which have been coated with a silicone release agent may also be used.

To a 35% solids solution of a pressure sensitive adhesive prepared from 85.0 parts of n-butylacrylate, 10.0 parts N-vinyl pyrrolidone and 5.0 parts acrylic acid are added 0.5% benzophenone based on solids. The benzophenone containing adhesive is then coated on conventional knife coating equipment and dried at 66° C. for ten minutes to yield an adhesive having a coating weight of 11.0 grains per 24 in.$^2$ (0.713 grams/154.8 cm.$^2$). The adhesive is then exposed to UV light at a dose rate of 2.3 joules/cm.$^2$ to give a crosslinked product.

The adhesive is laminated to the film sample with the polyurethane surface next to the adhesive and the vinyl film side exposed. The performance of this material is evaluated. First a 13 cm. × 13 cm. sample is laminated to the test substrate. The sample is then heat aged at 66° C. for one week in a recirculating air oven to determine edge shrinkage and appearance of the film after aging. This test is done to simulate the decorative film performance after it has been applied to the plasticized substrate for several years. The film did not wrinkle or show any edge shrinkage.

The adhesion of the decorative film composite to the test substrate is determined next. As described under test methods, the unaged adhesion (UA), the aged on panel (AOP), and aged on liner adhesion (AOL) were 4.5 lbs./inch (0.803 kg/cm.), 4.2 lbs./inch (0.752 kg/cm.), 4.0 lbs./inch, (0.713 kg/cm.), respectively.

The flexibility of the decorative film on the test substrate is next determined by subjecting the film to the above described 2000 cycle flexing test. No cracking of the vinyl layer or composite layer was seen in either case.

EXAMPLES 2-7

The decorative articles in Examples 2-7 are prepared as in Example 1, except other intermediate layers are substituted for the intermediate layer of Example 1. Test results for these articles are shown in Table 1.

TABLE 1

| Ex. | Intermediate Barrier Layer | Solvent | % Solids | Caliper (mm.) | Shrinkage | Aged on Substrate Edge Appearance |
|---|---|---|---|---|---|---|
| 2 | aliphatic-polyester urethane[a] | Isopropanol/2/1 | 20% | .11 | 0 | excellent |
| 3 | vinyl chloride-vinyl acetate copolymer[b] | MEK | 20% | .15 | 0 | excellent |
| 4 | partially hydrolyzed vinyl chloride-vinyl acetate copolymer[c] | MEK | 20% | .18 | 0 | excellent |
| 5 | vinyl chloride-vinyl acetate copolymer modified with maleic acid[d] | MEK | 20% | .15 | 0 | excellent |
| 6 | aromatic isocyanate-polyester polyurethane[e] | MEK | 20% | .09 | 0 | good |
| 7 | aromatic isocyanate-polyester polyurethane[f] | THF | 20% | .1 | 0 | good |

[a]Available from Mobay Chemical Corp. under the tradename Impranil 392.
[b]Available from Union Carbide Corp. under the tradename Vinylite VYHH.
[c]Available from Union Carbide Corp. under the tradename Vinylite VAGH.
[d]Available from Union Carbide Corp. under the tradename Vinylite VMCH.
[e]Available from B. F. Goodrich Co. under the tradename Estane 5703.
[f]Available from B. F. Goodrich Co. under the tradename Estane 5707.

EXAMPLES 8-10

Decorative composites are prepared as in Example 1 except that the adhesive is substituted by the adhesives described in Examples 8-10. The coating of these adhesives is conducted in a similar manner as in Example 1. Testing is carried out as in Example 1 and the data is shown in Table II. No wrinkling or edge shrinkage is seen after these films were aged on a plasticized substrate at 66° C.

TABLE II

| Ex. | Adhesive | Solvent | % Solids | Dry Coating Weight (gm/154.8 cm$^2$) | Cure | Adhesives (kg/cm) UA[a] | AOP[b] | AOL[c] |
|---|---|---|---|---|---|---|---|---|
| 8 | Methylbutyl acrylate, N—vinyl pyrrolidone-acrylic acid in a ratio of 85/10/5 parts | ethyl acetate | 25 | .64 | benzophenone @ 2.3 joules/cm$^2$. | .72 | .68 | .66 |
| 9 | n-butyl acrylate, methyl acrylate, acrylic acid in a ratio of 52.5/37.5/10 parts | ethyl acetate | 25 | .75 | bis-amide crosslinker at 1 g. per 100 g. adhesive and 10 minutes @ 66° C. | .7 | .75 | .66 |
| 10 | isooctyl acrylate, vinyl acetate, acrylic acid in a ratio of 56/40/4 parts | ethyl acetate | 25 | .83 | 10 minutes @ 66° F. | .98 | .84 | .64 |

[a] Unaged Adhesion
[b] Aged on Panel
[c] Aged on Liner

EXAMPLE 11

This example is identical to Example 1 except the intermediate layer has been eliminated. This film wrinkled severely when applied to the plasticized substrate and aged for one week at 66° C.

EXAMPLE 12

This example is the same as Example 11 except that the vinyl film thickness is 2.0 mils (0.050 mm.). This film wrinkled severely when applied to the test substrate and aged for one week at 66° C.

EXAMPLE 13

The combined vinyl film and polyurethane barrier layer as described in Example 1 is laminated to an adhesive made from 90 parts of isooctylacrylate and 10 parts of acrylic acid. When tested as described under test methods, the unaged adhesion (UA), aged on panel adhesion (AOP), and aged on liner adhesion (AOL) values were found to be 3.2 lbs./inch (0.57 kg/cm), 1.3 lbs./inch (0.23 kg/cm), and 2.6 lbs./inch (0.97 kg/cm), respectively. The aged samples lacked the requisite adhesion.

EXAMPLE 14

The film described in this example is specially formulated for low temperature flexibility. The film tested is similar to the film described in Example 1 except the vinyl layer contains a combination of two plasticizers, 24 parts of polymeric polyester and 12 parts vinyl acetate/ethylene copolymer (tradename Elvaloy 742). The vinyl caliper is 1.5 mils, and the adhesive is that which is described in Example 10.

The flexibility of this film is tested by subjecting the film to the cold temperature flexibility test described above. The film when tested unprocessed and processed with vinyl screen printing ink did not crack when impacted at 40 inches. The vinyl ink contains approximately 75 parts of vinyl acetate/ethylene copolymer (Elvaloy 742) to 100 parts of resin to meet the cold temperature flexibility requirements.

The adhesion of the decorative film composite to the substrate was determined by the test method described above. The unaged adhesion (UA), the 72 hour aged on panel (AOP) and 48 hour aged on liner adhesion (AOL) were 4.7 lbs./inch (0.837 kg/cm.). 3.7 lbs./inch (0.659 kg/cm.) and 3.5 lbs./inch (0.623 kg/cm.), respectively.

We claim:

1. A composite decorative article adapted for adherence to vinyl substrates containing migratable plasticizers, comprising:
   (1) a first layer comprising a polyvinyl chloride film;
   (2) a second layer of plasticizer tolerant pressure-sensitive adhesive comprising the reaction product of reactants comprising (a) acrylic acid and/or methacrylic acid and/or acrylamide, and/or methacrylamide (b) an alkylacrylate and/or alkylmethacrylate having at least 4 carbon atoms and wherein the carbon atom attached to the oxy atom of the carbonyloxy group has at least one hydrogen atom attached thereto, and (c) at least one additional ethylenically unsaturated monomer; and
   (3) a third layer between said first and second layers, said third layer adapted to inhibit migration of vinyl plasticizers through said third layer, said composite decorative article being wrinkle resistant and said adhesive being capable of providing an adherent bond to said vinyl substrate.

2. A composite decorative article adapted for adherence to vinyl substrates containing migratable plasticizers, comprising:
   (1) a first layer comprising a polyvinyl chloride film;
   (2) a second layer of plasticizer tolerant, pressure-sensitive adhesive comprising the polymeric reaction product of reactants consisting essentially of:
   (a) one or more acid or amide selected from the group consisting of acrylic acid, methacrylic acid, acrylamide, and methacrylamide;
   (b) one or more esters selected from the group consisting of n-butyl acrylate, methylbutyl acrylate, and iso-octyl acrylate; and
   (c) one or more additionally ethylenically unsaturated monomer;
   (3) a third layer between said first and second layers, said third layer adapted to inhibit migration of vinyl plasticizers through said third layer.

3. The article of claims 1 or 2 wherein said first layer has a thickness of from about 0.02 to 0.13 mm.

4. The article of claims 1 or 2 wherein said additional ethylenically unsaturated monomer has at least one member selected from the class consisting of N-vinyl pyrrolidone, methyl acrylate, and vinyl acetate.

5. The article of claims 1 or 2 wherein said third layer comprises a polyurethane.

6. The article of claims 1 or 2 wherein said third layer is in contact with said first and second layers.

7. The article of claim 1 wherein said plasticizer resistant, pressure-sensitive adhesive consists essentially of the reaction product of (a) n-butylacrylate, (b) acrylic acid, and (c) N-vinyl pyrrolidone.

8. The article of claim 7 wherein n-butylacrylate is present to the extent of about 85 parts by weight, the acrylic acid present to the extent of about 5 parts by weight and the N-vinyl pyrrolidone is present to the extent of about 10 parts by weight.

9. The article of claim 2 wherein the ester is n-butyl acrylate.

10. The article of claim 2 wherein the ester is methylbutyl acrylate.

11. The article of claim 2 wherein the ester is iso-octyl acrylate.

12. The article of claims 1 or 2 wherein said first layer has a thickness of from about 0.02 to about 0.13 mm. and said adherent bond of said adhesive to said vinyl substrate has a value of at least 3 lbs./inch after bonding and aging seven days at 66° C. per ASTM Test D-1000, Part B.

13. The article of claim 2 wherein the third layer comprises a polymer of vinyl chloride and at least one monomer copolymerizable therein.

14. A composite decorative article adapted for adherence to vinyl substrates containing migratable plasticizers, comprising:
(1) a first layer comprising a polyvinyl chloride film;
(2) a second layer of a plasticizer tolerant pressure-sensitive adhesive comprising the reaction product of reactants comprising (a) acrylic acid and/or methacrylic acid and/or acrylamide, and/or methacrylamide (b) and alkylacrylate and/or alkylmethacrylate having at least 4 carbon atoms and wherein the carbon atom attached to the oxy atom of the carbonyloxy group has at least one hydrogen atom attached thereto, and (c) at least one additional ethylenically unsaturated monomer; and
(3) a third layer between said first and second layers, said third layer comprising a polymer of vinyl chloride and at least one monomer copolymerizable therewith.

15. The article of claims 14 or 13 wherein said at least one monomer copolymerizable therewith includes vinyl acetate.

16. The article of claims 14 or 13 wherein said third layer polymer comprises the reaction product of vinyl chloride and vinyl acetate.

17. The article of claim 1 wherein said acrylic and/or methacrylic acid and/or acrylamide and/or methacrylamide is present to the extent of about 1% to about 10% by weight, said alkylacrylate and/or alkylmethacrylate is present to the extent of about 35% to about 85% by weight, and the balance is said ethylenically unsaturated monomer.

18. A method for marking a vinyl substrate having migratable plasticizers associated therewith, said method comprising bonding to said substrate a composite decorative article comprising an outer layer of vinyl film, an intermediate layer comprising a polyurethane resin or a vinyl resin, and an underlying layer of a plasticizer tolerant pressure-sensitive adhesive comprising the reaction product of reactants comprising (a) acrylic acid and/or methacrylic acid and/or acrylamide, and/or methacrylamide (b) an alkylacrylate and/or alkylmethacrylate, having at least 4 carbon atoms and wherein the carbon atom attached to the oxy atom of the carbonyloxy group has at least one hydrogen atom attached thereto, and (c) at least one additional ethylenically unsaturated monomer, said bonding being between said substrate and said adhesive.

19. The method of claim 18 wherein said vinyl film layer has a thickness of no more than 0.13 mm.

20. The method of claim 18 wherein said additional ethylenically unsaturated monomer has at least one member selected from the class consisting of N-vinyl pyrrolidone, methyl acrylate, and vinyl acetate.

* * * * *